(12) United States Patent
Nakamura et al.

(10) Patent No.: US 7,585,811 B2
(45) Date of Patent: *Sep. 8, 2009

(54) CATALYST POWDER, EXHAUST GAS PURIFYING CATALYST, AND METHOD OF PRODUCING THE CATALYST POWDER

(75) Inventors: Masanori Nakamura, Yokosuka (JP); Katsuo Suga, Yokohama (JP); Toru Sekiba, Yokohama (JP); Hironori Wakamatsu, Yokohama (JP); Kazuyuki Shiratori, Yokohama (JP); Hirofumi Yasuda, Yokosuka (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 205 days.

This patent is subject to a terminal disclaimer.

(21) Appl. No.: 10/589,890

(22) PCT Filed: Feb. 10, 2005

(86) PCT No.: PCT/JP2005/002525

§ 371 (c)(1),
(2), (4) Date: Aug. 18, 2006

(87) PCT Pub. No.: WO2005/079982

PCT Pub. Date: Sep. 1, 2005

(65) Prior Publication Data

US 2007/0203021 A1    Aug. 30, 2007

(30) Foreign Application Priority Data

Feb. 24, 2004  (JP) ............................. 2004-048370

(51) Int. Cl.
*B01J 23/00* (2006.01)
*B01J 21/00* (2006.01)
*B01J 20/00* (2006.01)

(52) U.S. Cl. ......... 502/327; 502/258; 502/259; 502/260; 502/261; 502/262; 502/263; 502/302; 502/303; 502/304; 502/326; 502/330; 502/332; 502/333; 502/334; 502/335; 502/336; 502/337; 502/338; 502/339; 502/348; 502/349; 502/350; 502/351; 502/355; 502/439

(58) Field of Classification Search ............... 502/258, 502/259, 260, 261, 262, 263, 302, 303, 304, 502/326, 327, 330, 332, 333, 334, 335, 336, 502/337, 338, 339, 348, 349, 350, 351, 355, 502/439

See application file for complete search history.

(56) References Cited

U.S. PATENT DOCUMENTS 2,980,662 A   4/1961  Jezl (Continued)

FOREIGN PATENT DOCUMENTS

EP    0 466 984 A1    1/1992

(Continued)

OTHER PUBLICATIONS

T. Shimizu et al., "Size Evolution of Alkanethiol-Protected Gold Nanoparticles by Heat Treatment in the Solid State," J. Phys. Chem. B, vol. 107, No. 12, 2003, pp. 2719-2724.

(Continued)

*Primary Examiner*—Cam N. Nguyen
(74) *Attorney, Agent, or Firm*—Foley & Lardner LLP (57) ABSTRACT

A method of producing catalyst powder of the present invention has a step of precipitating a noble metal particle (2) and a porous carrier (1) in a reversed micelle substantially simultaneously; and a step of precipitating a transition metal particle (3) in the reversed micelle. By this method, it is possible to obtain catalyst powder which restricts an aggregation of the noble metal particles even at a high temperature and is excellent in a catalytic activity.

6 Claims, 6 Drawing Sheets

U.S. PATENT DOCUMENTS

| | | | | |
|---|---|---|---|---|
| 3,255,020 | A | 6/1966 | Ferrell | |
| 3,266,477 | A | 8/1966 | Stiles | |
| 3,271,322 | A * | 9/1966 | Stiles | 502/159 |
| 3,357,916 | A | 12/1967 | Smith | |
| 3,388,077 | A * | 6/1968 | Hoekstra | 502/328 |
| 3,478,329 | A | 11/1969 | De Rudnay | |
| 3,531,329 | A | 9/1970 | Selwitz | |
| 3,649,566 | A | 3/1972 | Hayes et al. | |
| 4,255,289 | A * | 3/1981 | Balinsky et al. | 502/327 |
| 4,255,290 | A | 3/1981 | Flagg et al. | |
| 4,261,862 | A | 4/1981 | Kinoshita et al. | |
| 4,274,981 | A | 6/1981 | Suzuki et al. | |
| 4,369,132 | A | 1/1983 | Kinoshita et al. | |
| 4,374,046 | A | 2/1983 | Antos | |
| 4,425,261 | A | 1/1984 | Stenius et al. | |
| 4,440,874 | A | 4/1984 | Thompson | |
| 4,444,721 | A | 4/1984 | Ohkata | |
| RE31,719 | E | 10/1984 | Sonetaka et al. | |
| 4,495,304 | A | 1/1985 | Yoo et al. | |
| 4,539,311 | A | 9/1985 | Harrison et al. | |
| 4,548,921 | A | 10/1985 | Geus et al. | |
| 4,585,752 | A * | 4/1986 | Ernest | 502/304 |
| 4,714,693 | A | 12/1987 | Targos | |
| 4,716,087 | A | 12/1987 | Ito et al. | |
| 4,738,947 | A * | 4/1988 | Wan et al. | 502/304 |
| 4,758,418 | A | 7/1988 | Yoo et al. | |
| 4,765,874 | A | 8/1988 | Modes et al. | |
| 4,793,797 | A * | 12/1988 | Kato et al. | 431/7 |
| 4,839,146 | A | 6/1989 | Cho et al. | |
| 4,857,499 | A * | 8/1989 | Ito et al. | 502/326 |
| 4,904,633 | A | 2/1990 | Ohata et al. | |
| 4,969,265 | A | 11/1990 | Ehara | |
| 5,039,647 | A * | 8/1991 | Ihara et al. | 502/251 |
| 5,068,218 | A | 11/1991 | Nishizawa | |
| 5,108,469 | A | 4/1992 | Christ | |
| 5,112,787 | A | 5/1992 | Falke et al. | |
| 5,122,496 | A * | 6/1992 | Vorlop et al. | 502/245 |
| 5,248,650 | A | 9/1993 | Sekiba et al. | |
| 5,318,757 | A * | 6/1994 | Abe et al. | 422/174 |
| 5,395,406 | A | 3/1995 | Clavenna et al. | |
| 5,427,989 | A | 6/1995 | Kanesaka et al. | |
| 5,446,003 | A | 8/1995 | Augustine et al. | |
| 5,516,741 | A | 5/1996 | Gascoyne et al. | |
| 5,610,117 | A * | 3/1997 | Horiuchi et al. | 502/324 |
| 5,622,048 | A | 4/1997 | Aoyama et al. | |
| 5,640,847 | A | 6/1997 | Nakajima et al. | |
| 5,644,912 | A | 7/1997 | Kawamura | |
| 5,677,258 | A | 10/1997 | Kurokawa et al. | |
| 5,750,458 | A | 5/1998 | Kennelly et al. | |
| 5,814,576 | A | 9/1998 | Yamamoto | |
| 5,814,577 | A | 9/1998 | Park et al. | |
| 5,849,660 | A | 12/1998 | Takemoto et al. | |
| 5,911,961 | A | 6/1999 | Horiuchi et al. | |
| 5,916,839 | A | 6/1999 | Pak et al. | |
| 5,977,012 | A | 11/1999 | Kharas et al. | |
| 6,047,544 | A | 4/2000 | Yamamoto et al. | |
| 6,057,263 | A | 5/2000 | Takahashi et al. | |
| 6,066,410 | A | 5/2000 | Auer et al. | |
| 6,066,587 | A | 5/2000 | Kurokawa et al. | |
| 6,069,111 | A | 5/2000 | Yamamoto et al. | |
| 6,080,371 | A | 6/2000 | Tanabe et al. | |
| 6,083,467 | A | 7/2000 | Takeshima et al. | |
| 6,107,239 | A | 8/2000 | Qin et al. | |
| 6,110,862 | A | 8/2000 | Chen et al. | |
| 6,172,000 | B1 | 1/2001 | Chattha et al. | |
| 6,180,075 | B1 | 1/2001 | Lindner et al. | |
| 6,221,805 | B1 | 4/2001 | Yamashita et al. | |
| 6,228,800 | B1 | 5/2001 | Yamaguchi et al. | |
| 6,284,201 | B1 | 9/2001 | Buck | |
| 6,296,813 | B1 | 10/2001 | Ishii et al. | |
| 6,306,794 | B1 * | 10/2001 | Suzuki et al. | 502/304 |
| 6,335,305 | B1 * | 1/2002 | Suzuki et al. | 502/325 |
| 6,370,870 | B1 | 4/2002 | Kamijo et al. | |
| 6,440,378 | B1 * | 8/2002 | Hirata et al. | 423/239.1 |
| 6,444,610 | B1 | 9/2002 | Yamamoto | |
| 6,475,446 | B1 | 11/2002 | Horiike et al. | |
| 6,503,862 | B1 | 1/2003 | Yamamoto | |
| 6,511,642 | B1 | 1/2003 | Hatanaka et al. | |
| 6,514,905 | B1 | 2/2003 | Hanaki et al. | |
| 6,518,213 | B1 | 2/2003 | Yamamoto et al. | |
| 6,569,803 | B2 * | 5/2003 | Takeuchi | 502/328 |
| 6,589,901 | B2 | 7/2003 | Yamamoto et al. | |
| 6,623,716 | B2 | 9/2003 | Suga et al. | |
| 6,660,897 | B1 | 12/2003 | Martchal-George et al. | |
| 6,680,279 | B2 | 1/2004 | Cai et al. | |
| 6,729,125 | B2 | 5/2004 | Suga et al. | |
| 6,756,336 | B2 * | 6/2004 | Kasahara et al. | 502/65 |
| 6,764,665 | B2 | 7/2004 | Deeba et al. | |
| 6,787,500 | B2 | 9/2004 | Ito et al. | |
| 6,800,388 | B2 | 10/2004 | Kaneko et al. | |
| 6,861,387 | B2 | 3/2005 | Ruth et al. | |
| 6,887,443 | B2 | 5/2005 | Suga et al. | |
| 6,887,444 | B1 | 5/2005 | Yamamoto | |
| 6,896,857 | B2 | 5/2005 | Nakamura et al. | |
| 6,926,875 | B2 | 8/2005 | Hatanaka et al. | |
| 6,956,007 | B2 * | 10/2005 | Cai et al. | 502/303 |
| 6,967,183 | B2 * | 11/2005 | Hampden-Smith et al. | 502/101 |
| 7,029,514 | B1 | 4/2006 | Yang et al. | |
| 7,041,866 | B1 * | 5/2006 | Gillespie | 585/750 |
| 7,081,431 | B2 * | 7/2006 | Yamashita et al. | 502/332 |
| 7,150,861 | B2 * | 12/2006 | Morita et al. | 423/213.5 |
| 7,351,679 | B2 * | 4/2008 | Eri et al. | 502/327 |
| 2001/0004832 | A1 | 6/2001 | Hanaki et al. | |
| 2001/0006934 | A1 | 7/2001 | Kachi et al. | |
| 2001/0021358 | A1 | 9/2001 | Kikuchi et al. | |
| 2002/0045543 | A1 | 4/2002 | Takatori et al. | |
| 2003/0004054 | A1 | 1/2003 | Ito et al. | |
| 2003/0083193 | A1 | 5/2003 | Takaya et al. | |
| 2003/0167752 | A1 | 9/2003 | Niwa et al. | |
| 2003/0181316 | A1 | 9/2003 | Hiramoto et al. | |
| 2004/0055280 | A1 | 3/2004 | Nishizawa et al. | |
| 2004/0254069 | A1 | 12/2004 | Ito | |
| 2005/0170958 | A1 | 8/2005 | Kikuchi et al. | |
| 2005/0215429 | A1 | 9/2005 | Wakamatsu et al. | |
| 2005/0221978 | A1 | 10/2005 | Shiratori et al. | |
| 2007/0153390 | A1 | 7/2007 | Nakamura et al. | |
| 2007/0155626 | A1 | 7/2007 | Yasuda et al. | |
| 2007/0167319 | A1 | 7/2007 | Shiratori et al. | |
| 2007/0244001 | A1 | 10/2007 | Wakamatsu et al. | |

FOREIGN PATENT DOCUMENTS

| | | |
|---|---|---|
| EP | 0 931 590 B1 | 7/1999 |
| EP | 0 940 176 A2 | 9/1999 |
| EP | 1 043 065 A1 | 10/2000 |
| EP | 1 494 304 A1 | 1/2005 |
| JP | 56-010333 A | 2/1981 |
| JP | 58-186441 A | 10/1983 |
| JP | 59-230639 A | 12/1984 |
| JP | 7-246343 A | 9/1995 |
| JP | 09-122492 A | 5/1997 |
| JP | 10-216517 A | 8/1998 |
| JP | 11-057473 A | 3/1999 |
| JP | 11-314035 A | 11/1999 |
| JP | 2000-001119 A | 1/2000 |
| JP | 2000-015098 A | 1/2000 |
| JP | 2000-042411 A | 2/2000 |
| JP | 2000-279824 A | 10/2000 |
| JP | 2000-296339 A | 10/2000 |
| JP | 2001-198466 A | 7/2001 |
| JP | 3251009 B2 | 11/2001 |
| JP | 2002-066335 A | 3/2002 |
| JP | 2002-102703 A | 4/2002 |
| JP | 2002-233755 A | 8/2002 |

| | | |
|---|---|---|
| JP | 2002-355558 A | 12/2002 |
| JP | 2002-361086 A | 12/2002 |
| JP | 2003-080077 A | 3/2003 |
| JP | 2003-126694 A | 5/2003 |
| JP | 2003-144923 A | 5/2003 |
| JP | 2003-164764 A | 6/2003 |
| JP | 2003-181290 A | 7/2003 |
| JP | 2003-181293 A | 7/2003 |
| JP | 2003-290658 A | 10/2003 |
| JP | 2003-290667 A | 10/2003 |
| JP | 2003-311128 A | 11/2003 |
| JP | 2004-016838 A | 1/2004 |
| JP | 2004-043217 A | 2/2004 |
| JP | 2004-082000 A | 3/2004 |
| JP | 2004-174490 A | 6/2004 |
| JP | 2004-267961 A | 9/2004 |
| JP | 2005-081183 A | 3/2005 |
| JP | 2005-305300 A | 11/2005 |
| WO | WO-95/32790 A1 | 12/1995 |
| WO | WO-97/09114 A1 | 3/1997 |
| WO | WO-2005/063390 A1 | 7/2005 |
| WO | WO-2005/063391 A1 | 7/2005 |

OTHER PUBLICATIONS

U.S. Appl. No. 11/722,275, filed Jun. 20, 2007, Nakamura et al.

A. Martínez-Arias et al., "Study of the lean NOx reduction with C3H6 in the presence of water over silver/alumina catalysts prepared from inverse microemulsions," Applied Catalysts B: Environmental, vol. 28, 2000, pp. 29-41.

H. Wakamatsu et al., U.S. Appl. No. 11/578,295, Mar. 19, 2009, 8 pgs.

H. Wakamatsu et al., U.S. Appl. No. 11/578,295, Oct. 2, 2008, 15 pgs.

H. Wakamatsu, et al., U.S. Appl. No. 11/079,270, Mar. 4, 2009, 6 pgs.

H. Wakamatsu, et al., U.S. Appl. No. 11/079,270, May 12, 2008, 7 pgs.

H. Wakamatsu, et al., U.S. Appl. No. 11/079,270, Jul. 21, 2008, 5 pgs.

H. Wakamatsu, et al., U.S. Appl. No. 11/079,270, Aug. 25, 2008, 20 pgs.

H. Yasuda et al., U.S. Appl. No. 10/586,533, dated Jul. 14, 2008, 6 pgs.

H. Yasuda et al., U.S. Appl. No. 10/586,533, dated Nov. 18, 2008, 16 pgs.

K. Shiratori, et al., U.S. Appl. No. 10/584,346, dated Jul. 11, 2008, 5 pgs.

K. Shiratori, et al., U.S. Appl. No. 10/584,346, dated Nov. 18, 2008, 19 pgs.

K. Shiratori, et al., U.S. Appl. No. 11/079,377, dated Mar. 12, 2009, 7 pgs.

K. Shiratori, et al., U.S. Appl. No. 11/079,377, dated May 8, 2008, 6 pgs.

K. Shiratori, et al., U.S. Appl. No. 11/079,377, dated Jul. 28, 2008, 18 pgs.

M. Che et al., "A Study of the Chemisorption of Nitric Oxide on PdY Zeolite, Evidence for a Room Temperature Oxidative Dissolution of Pd Crystallites," The Journal of Physical Chemistry, vol. 60, No. 21, 1976, 11 pgs.

M. Nakamura et al., U.S. Appl. No. 10/584,243, dated Aug. 6, 2008, 5 pgs.

M. Nakamura et al., U.S. Appl. No. 10/584,243, dated Dec. 26, 2008, 24 pgs.

PH. Buffat and J-P Borel, "Size effect on the melting temperature of gold particles," Physical Review A, Jun. 1976, vol. 13, No. 6, 12 pgs.

R. Willis, "Pumice, Porous Volcanic Rock," Online, XP002364316, URL:http://ceramic-materials.com/cermat/material/2009.html>.

S. Eriksson,et al., "Preparation of Catalysts from Microemulsions and Their Applications in Heterogeneous Catalysis," Applied Catalysis A: General, vol. 265, No. 2, Jul. 8, 2004, pp. 207-219.

T. Kinoshita et al., "Magnetic evaluation of nanostructure of gold—iron composite particles synthesized by a reverse micelle method," Journal of Alloys and Compounds, vol. 359, No. 1-2, Sep. 22, 2003, pp. 46-50.

W.Y. Kim et al., "Methanol synthesis from syngas over supported palladium catalysts prepared using water-in-oil microemulsion," Applied Catalysis A: General, vol. 169, 1998, pp. 157-164.

* cited by examiner

CATALYST POWDER, EXHAUST GAS PURIFYING CATALYST, AND METHOD OF PRODUCING THE CATALYST POWDER

TECHNICAL FIELD

This invention relates to catalyst powder suitable for an exhaust gas purifying catalyst which purifies exhaust gas discharged from an internal combustion engine, and to a method of producing the catalyst powder.

BACKGROUND ART

In general, a three-way catalyst is used in order to detoxify exhaust gas which is discharged from an internal combustion engine such as an automotive engine and contains hydrocarbon (HC), carbon monoxide (CO) and nitrogen oxide (NOx). As an example of the three-way catalyst, one in which noble metal particles of platinum (Pt), palladium (Pd), rhodium (Rh) and the like are carried on a carrier of alumina ($Al_2O_3$) or the like as a porous body is given.

As another example of the three-way catalyst, a three-way catalyst in which one formed by carrying ones to be described below on active alumina by an impregnation method are carried on a honeycomb substrate is proposed. The ones carried on the honeycomb substrate are: at least one selected from cerium (Ce), zirconium (Zr), iron (Fe) and nickel (Ni); at least one selected from Pt, Pd and Rh; and at least one selected from neodymium (Nd), lanthanum (La) and praseodymium (Pr) according to needs (refer to Japanese Patent Laid-Open Publication No. S59-230639 (published in 1984)).

A purification reaction for the exhaust gas is a catalytic reaction progressing on a surface of the noble metal. Accordingly, a catalytic activity of the noble metal is substantially proportional to a surface area of the noble metal. Therefore, in order to obtain the maximum catalytic activity from a small amount of the noble metal, it is preferable to produce noble metal particles with a small particle diameter and a large specific surface area, and to evenly disperse the noble metal particles on the porous carrier while maintaining the particle diameter.

DISCLOSURE OF THE INVENTION

Figure 7:
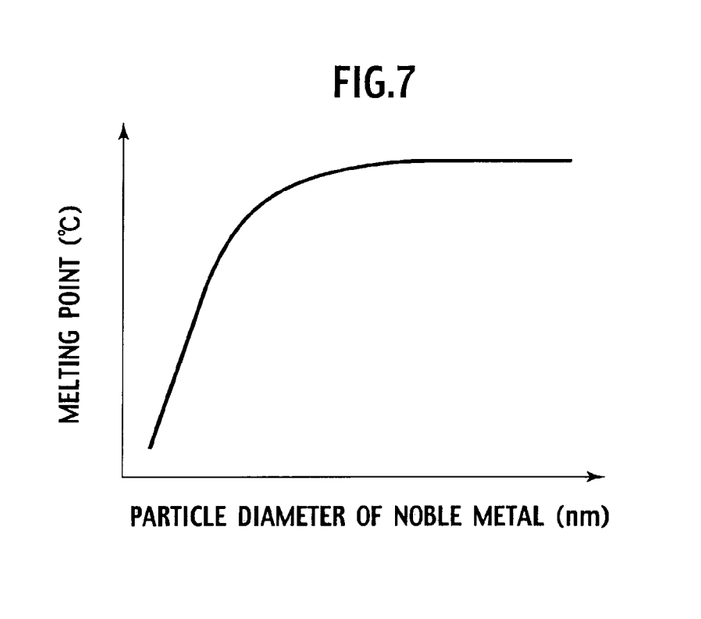
FIG. 7 is a graph showing a relationship between a particle diameter of noble metal and a melting point thereof.
Figure 8:
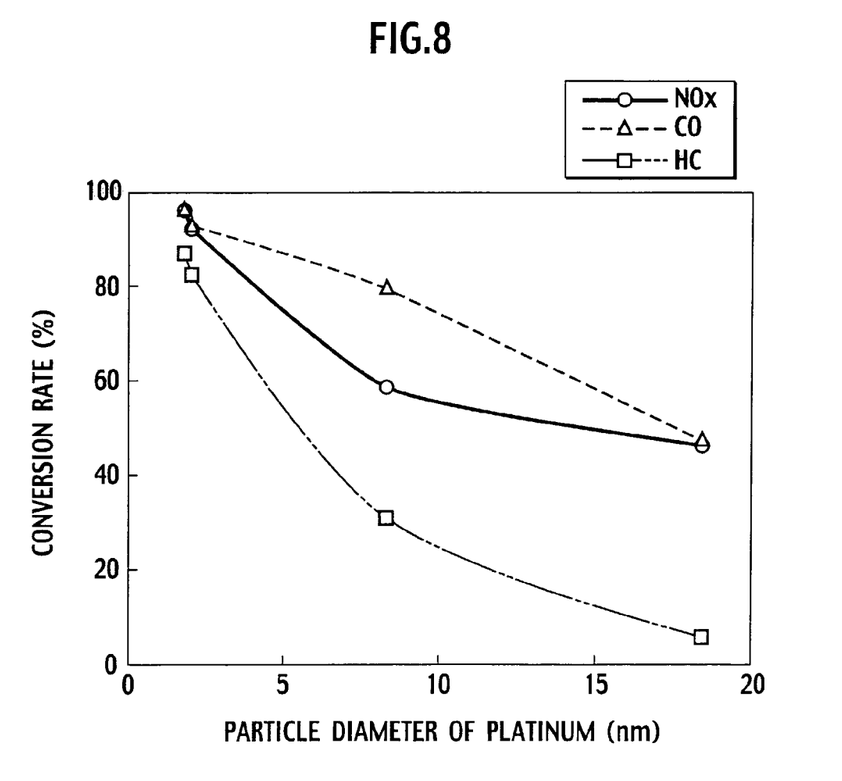
FIG. 8 is a graph showing a relationship between a particle diameter of platinum and a conversion rate.

However, even if the noble metal is highly dispersed on the carrier, the noble metal particles with a particle diameter of less than 10 nm have high surface reactivity and have large surface energy, and accordingly, are very unstable. Moreover, as shown in FIG. 7, a melting point of the noble metal particles is radically lowered when the particle diameter becomes 5 nm or less (refer to *J. Phys. Chem. B,* 107, pp. 2719-2724 (2003)). Therefore, the noble metal particles with the small particle diameter come close to one another, leading to easy sintering thereof. In particular, Pt significantly aggregates when being heated, and even if the Pt is evenly dispersed on the carrier, the Pt aggregates by being heated, and the particle diameter thereof is enlarged. Therefore, as shown in FIG. 8, exhaust gas purification performance of the Pt is lowered owing to such aggregation of the Pt, which is caused by being heated. The automotive catalyst is exposed to high temperature of 800 to 900° C. in usual, and more than 1000° C. according to cases. Accordingly, it is usually difficult to prevent the aggregation of the noble metal particles with the small particle diameter and to maintain the particle diameter when the particles are produced, thereby maintaining the catalytic activity.

In order to prevent the aggregation of the noble metal particles, it is conceived to reduce the surface energy of the noble metal particles. However, though it is necessary to increase the particle diameter of the noble metal particles to 50 to 100 nm in order to restrict the surface energy, the catalytic activity itself is lost in the case of this particle diameter.

Figure 9A:
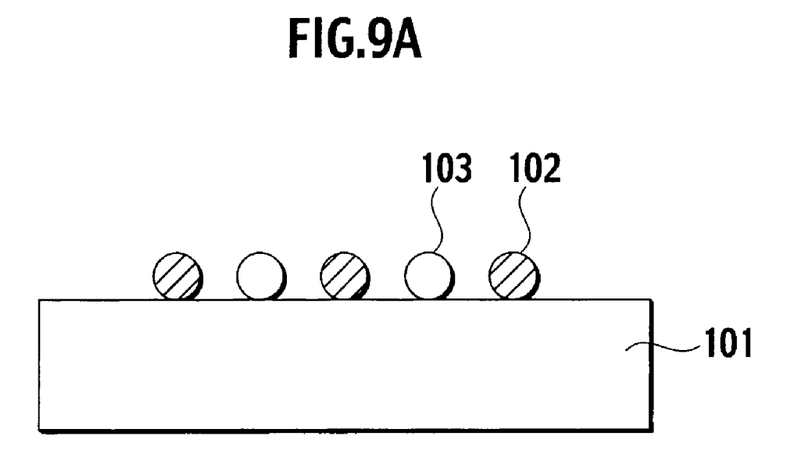
FIG. 9A is a schematic view showing a produced state of conventional catalyst powder.
Figure 9B:
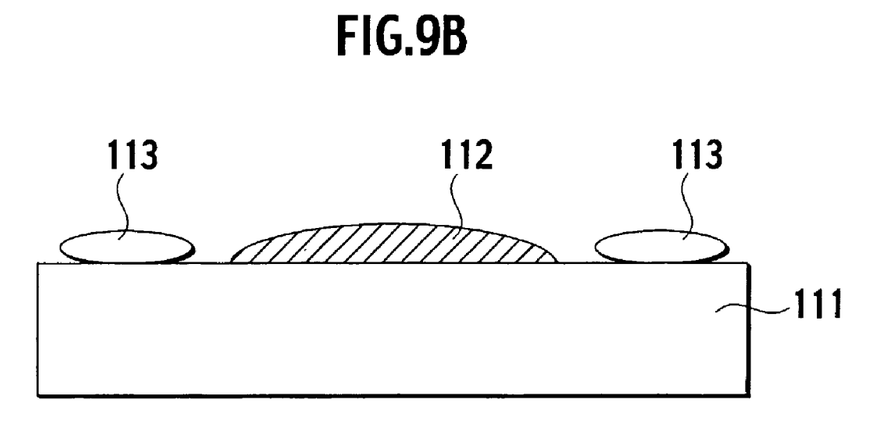
FIG. 9B is a schematic view showing a state of the conventional catalyst powder after being heated.

Moreover, in the conventional catalyst in which the noble metal and the transition metal are carried on alumina, noble metal particles 102 and transition metal particles 103 do not come into much contact with each other as shown in FIG. 9A. Therefore, the transition metal particles 103 cannot achieve a role of preventing the aggregation of the noble metal particles 102. As shown in FIG. 9A, when the catalyst is produced, a particle diameter of the noble metal particles 102 is small, and the transition metal particles 103 are interposed between the noble metal particles 102. However, as shown in FIG. 9B, when the catalyst is heated, the noble metal particles 112 aggregate on an active alumina 111, and the particle diameter thereof is enlarged. Therefore, the catalytic activity is lowered.

The present invention is one made focusing attention on the above-described problems inherent in the background art. It is an object of the present invention to provide catalyst powder which restricts the aggregation of the noble metal particles even at the high temperature and is excellent in the catalytic activity, and to provide an exhaust gas purifying catalyst using the catalyst powder, and a method of producing the catalyst powder.

The first aspect of the present invention provides catalyst powder comprising: a porous carrier; a noble metal particle which is partially buried in the porous carrier and carried in a state of being held by the carrier, the noble metal particle having a mean particle diameter of 1 to 10 nm; and a transition metal particle in contact with both of the noble metal particle and the porous carrier.

The second aspect of the present invention provides a method of producing catalyst powder comprising: precipitating a noble metal particle and a porous carrier in a reversed micelle substantially simultaneously; and precipitating a transition metal particle in the reversed micelle.

The third aspect of the present invention provides a method of producing catalyst powder comprising: preparing a reversed micellar solution including a reversed micelle which contains an aqueous solution containing noble metal salt and an aqueous solution containing a carrier precursor; mixing a precipitant into the reversed micellar solution in order to precipitate a noble metal particle and a carrier in the reversed micelle substantially simultaneously; mixing an aqueous solution containing transition metal salt after the noble metal particle and the carrier are precipitated; and mixing a precipitant into the reversed micellar solution in order to precipitate a transition metal particle in the reversed micelle.

The fourth aspect of the present invention provides a method of producing catalyst powder comprising: preparing a reversed micellar solution including a reversed micelle which contains an aqueous solution containing transition metal salt; mixing a precipitant into the reversed micellar solution in order to precipitate a transition metal particle in the reversed micelle; mixing an aqueous solution containing noble metal salt and an aqueous solution containing a carrier precursor after the transition metal particle is precipitated; and mixing a precipitant into the reversed micellar solution in order to precipitate a noble metal particle and a carrier in the reversed micelle substantially simultaneously.

The fifth aspect of the present invention provides an exhaust gas purifying catalyst comprising: catalyst powder including: a porous carrier; noble metal particles which are partially buried in the porous carrier, are carried in a state of being held by the carrier, and have a mean particle diameter of 1 to 10 nm; and transition metal particles in contact with both of the noble metal particles and the porous carrier, wherein an amount of the noble metal is 0.7 g or less per 1 L of a volume of the exhaust gas purifying catalyst.

BEST MODE FOR CARRYING OUT THE INVENTION

Details of catalyst powder, an exhaust gas purifying catalyst, and a method of producing the catalyst powder, which are according to the present invention, will be described below.

(Catalyst Powder)

An embodiment of the catalyst powder according to the present invention will be described. The catalyst powder according to this embodiment is characterized by including noble metal particles which are partially buried in a porous carrier, are carried in a state of being held by the carrier, and have a mean particle diameter of 1 to 10 nm, and including transition metal particles in contact with both of the noble metal particles and the porous carrier.

Figure 1:
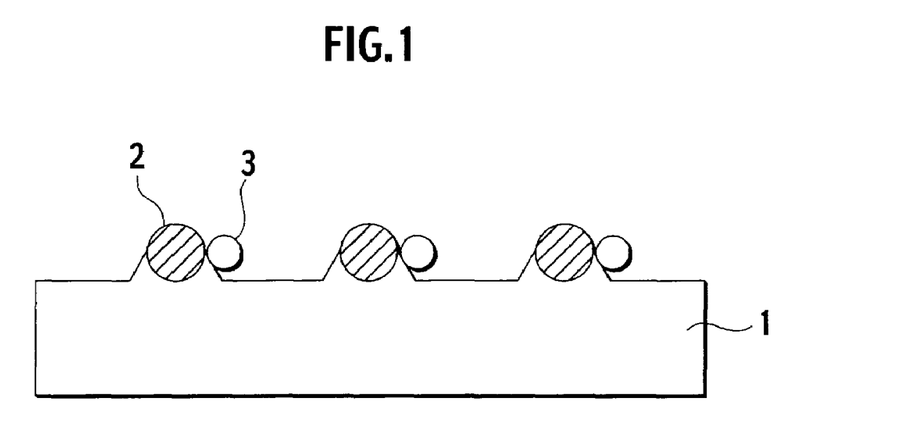
FIG. 1 is a schematic view showing a produced state of catalyst powder according to the present invention.

In general, sintering of the noble metal particles occurs by a mechanism in which the noble metal particles dispersed in an island shape on the carrier move on a surface of the carrier, encounter the other particles, and are fused therewith. However, in the catalyst powder of the invention of this application, as shown in FIG. 1, noble metal particles 2 are partially buried in a porous carrier 1, and consequently, the noble metal particles 2 are carried on the carrier 1 in the state of being held thereby. With such a configuration, the carrier 1 functions as an anchor which controls such a movement of the noble metal particles 2 on the surface of the carrier, and accordingly, aggregation of the noble metal particles 2 can be restricted. In particular, the noble metal particles are prone to aggregate as described above when the particle diameter of the noble metal particles is 10 nm or less. However, with such a configuration of the invention of this application, the noble metal particles 2 are engaged with the carrier 1, and accordingly, the aggregation thereof is controlled. Even if the noble metal particles 2 have been heated, the noble metal particles 2 can be maintained in a produced state of the catalyst powder. Therefore, it is made possible to obtain catalyst powder excellent in durability.

Moreover, as shown in FIG. 7, an inflection point of a melting point of the noble metal particles is at approximately 5 nm. Accordingly, when the particle diameter of the noble metal becomes smaller than 5 nm, the melting point is significantly lowered, and the noble metal is prone to be melted and to aggregate. Meanwhile, as shown in FIG. 8, as the particle diameter of the noble metal is smaller, a conversion rate thereof becomes higher, and the noble metal has a higher function as the catalyst powder. Meanwhile, when the particle diameter is large, a catalytic activity of the noble metal is lowered. Therefore, a balance between the aggregation of the noble metal and the catalytic activity thereof has been studied. As a result, it is preferable that the particle diameter of the noble metal in the state of being carried on the porous carrier be within a range from 3 nm to 8 nm. Note that the particle diameter of the noble metal can be obtained from observations using a laser diffraction/scattering method, an X-ray diffraction line broadening analysis and a transmission electron microscope, and the like.

Furthermore, in this catalyst powder, it is desirable to supplement the catalytic activity by including the transition metal in contact with both of the noble metal particles and the porous carrier. In the case where the transition metal is added and is further brought into contact with both of the noble metal particles and the porous carrier, when a ratio of oxygen to a reducer in exhaust gas is in a stoichiometric state where a theoretical air fuel ratio is approximately 14.7, a phenomenon called a spillover occurs. In the spillover, hydrogen molecules in the exhaust gas are first dissociated into hydrogen atoms, hydrogen atoms are adsorbed on surfaces of the noble metal particles, and then hydrogen atoms are moved to surfaces of the transition metal to reduce NOx thereon. Specifically, as shown in FIG. 1, the transition metal particles 3 are in contact with both of the noble metal particles 2 and the porous carrier 1, and thus the noble metal particles 2 function as sites which adsorb hydrogen, and the transition metal particles 3 function as a catalyst which reduces NOx. In such a way, a state where the hydrogen reaches the transition metal easily is formed, thus making it possible to enhance NOx reduction performance of the transition metal. Specifically, an effect of supplementing the catalytic activity of the noble metal by the transition metal is obtained, and accordingly, an amount of noble metal usage can be decreased.

As described above, as shown in FIG. 1, the catalyst powder according to this embodiment includes the noble metal particles 2 which are partially buried in the porous carrier 1, are carried in the state of being held by the carrier, and have the mean particle diameter of 1 to 10 nm, and including the transition metal particles 3 in contact with both of the noble metal particles 2 and the porous carrier 1. Hence, the aggregation of the noble metal particles 2 on the porous carrier 1 can be controlled even after a durability test, and accordingly, a dispersed state of the catalyst powder when being produced is maintained. Accordingly, the catalytic activity can be maintained even after use for many years, thus making it possible to obtain catalyst powder excellent in durability. Moreover, the transition metal particles 3 are brought into contact with the porous carrier 1 and the noble metal particles 2. Accordingly, the effect of supplementing the catalytic activity of the noble metal by the transition metal can be obtained. As a result, the amount of noble metal usage can be decreased.

Figure 2:
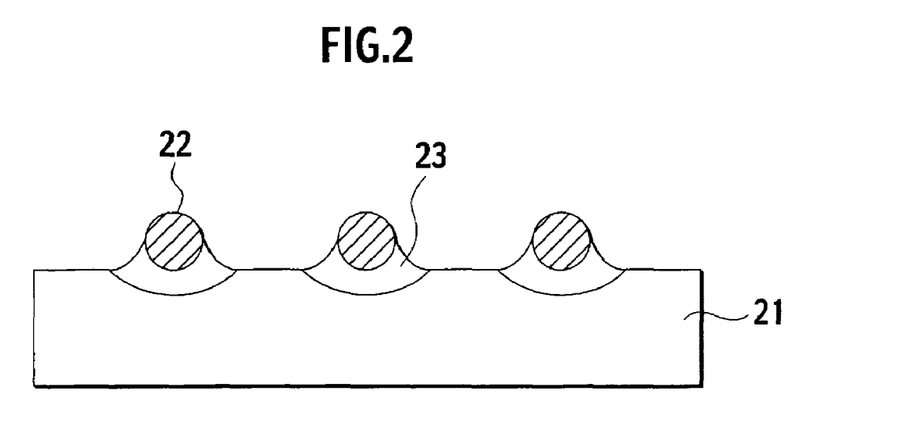
FIG. 2 is a schematic view showing a produced state of catalyst powder according to another embodiment of the present invention.

Note that a part or whole of the transition metal may form a complex compound together with the porous carrier. Specifically, as shown in FIG. 2, a part or whole of the transition metal carried on a surface of a porous carrier 21 may form a complex compound 23 with the carrier 21, and noble metal particles 22 may be carried on this complex compound 23. In such a case, the complex compound 23 and the noble metal particles 22 are stabilized on the carrier 21. Specifically, the porous carrier, and in particular, alumina causes a phase transition when being exposed to high temperature of 650° C. or more, and accordingly, a surface shape of the carrier is changed. In this case, even in the state where the noble metal is buried in the carrier, such an anchor effect is weakened owing to the phase transition of the carrier, leading to a high possibility that the noble metal particles approach one another to aggregate. However, when a part or whole of the transition metal forms the complex compound 23 with the carrier 21, the complex compound 23 controls the phase transition of the carrier 21, thus making it possible to maintain dispersivity of the noble metal particles 22. Moreover, when the noble metal particles 22 are in a state of being partially buried in the complex compound 23, the complex compound 23 functions as the anchor more strongly. Accordingly, the noble metal particles 22 become difficult to desorb from the surface of the carrier 21. Hence, a dispersed state of the noble metal when the catalyst powder is produced is maintained even after a durability test. Accordingly, the catalytic activity is maintained, thus making it possible to obtain the catalyst powder excellent in durability. Hence, when the catalyst powder is produced, the aggregation thereof can be prevented and the durability thereof can be enhanced without forming the noble metal into particles of a size at which the catalytic activity itself is lost. Note that the complex compound may be in a state of a complex oxide and an alloy.

Furthermore, it is preferable that a degree of dispersion of the noble metal carried on the porous carrier be 50% or more. The degree of dispersion is present as a scale for determining a distribution of the noble metal. The degree of dispersion is referred to as a ratio of noble metal atoms exposed to the surface of the carrier among the atoms dispersed in the carrier, and is a magnitude to be determined by a size and shape of the noble metal particles. In usual, noble metal atoms present on the surface of the noble metal particle effectively function as a catalyst, thus, in general, a high degree of dispersion is required. As one of measurement methods of the degree of dispersion, there is a method for measuring an adsorbed amount of carbon monoxide (CO) by adsorbing the carbon monoxide on the surface of the noble metal. When the noble metal is in the state of being buried in the carrier as shown in FIGS. 1 and 2, the exposed ratio of the noble metal to the surface of the carrier is smaller as compared with that of catalyst powder produced by an impregnation method as shown in FIG. 9A. Therefore, the degree of dispersion of the noble metal, which is obtained by the measurement method described above, is lowered as compared with the catalyst powder produced by the impregnation method. However, it is preferable that the concerned degree of dispersion be 50% or more. When the degree of dispersion is less than 50%, the performance of the noble metal is lowered.

Moreover, it is preferable that the noble metal be at least one selected from platinum (Pt), palladium (Pd) and rhodium (Rh), and two or more of the noble metals, for example, Pt and Rh may be mixed together and carried on the porous carrier. Furthermore, it is preferable that the transition metal be at least one selected from manganese (Mn), iron (Fe), cobalt (Co), nickel (Ni), copper (Cu) and zinc (Zn), and two or more of the transition metals may be mixed together for use. Furthermore, it is preferable that the carrier be alumina ($Al_2O_3$), cerium oxide ($CeO_2$), zirconium oxide ($ZrO_2$), silicon oxide ($SiO_2$), titanium oxide ($TiO_2$) and silica alumina, and two or more of the carriers may be mixed together for use.

Among them, it is more preferable that the noble metal be Pt, that the transition metal be Co, and that the carrier be $Al_2O_3$. In this case, Co has high affinity with $Al_2O_3$, and accordingly, forms cobalt aluminate easily. Then, Pt is fixed on a surface of the cobalt aluminate, and accordingly, the aggregation of Pt can be prevented.

Furthermore, it is preferable that this catalyst powder contain at least one selected from cerium (Ce), neodymium (Nd), praseodymium (Pr), lanthanum (La), zirconium (Zr), barium (Ba) and magnesium (Mg). It is necessary to evenly disperse the noble metal on the porous carrier in order to enhance the catalytic activity, and substantially simultaneously, heat resistance is required for the porous carrier. In order to improve the heat resistance of the carrier, it is conceived to use a thermally stable porous carrier (for example, $\alpha$-$Al_2O_3$). However, a specific surface area of $\alpha$-$Al_2O_3$ is small, and a distance between the noble metal particles carried on this carrier is shortened, and the aggregation of the noble metal is prone to occur. In this connection, at least one selected from Ce, Nd, Pr, La, Zr, Ba and Mg are added to the above-described catalyst powder, and thus the phase transition of the porous carrier is controlled to improve the heat resistance. Accordingly, the aggregation of the noble metal can be restricted.

(Method of Producing Catalyst Powder)

Next, an embodiment of a method of producing catalyst powder according to the present invention will be described.

Figure 3:
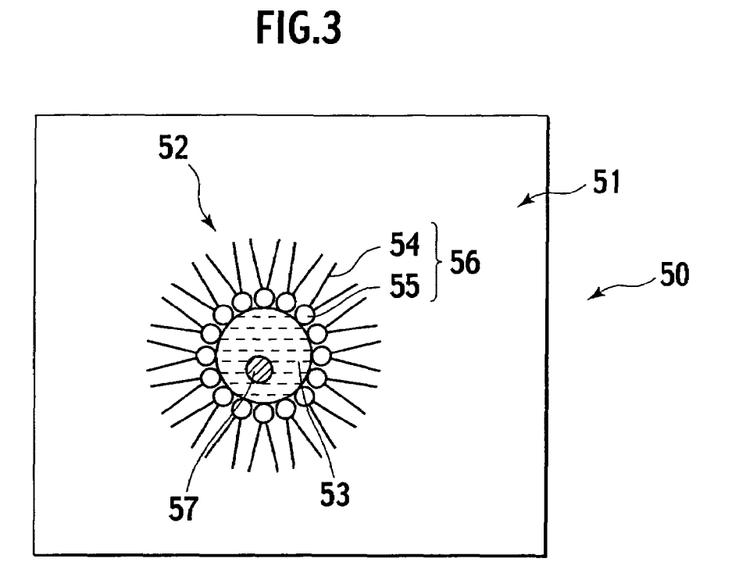
FIG. 3 is a view for explaining a reversed micellar solution.

The method of producing catalyst powder according to the present invention is characterized in that the catalyst powder is produced by use of a reversed micelle method. Use of this method makes it possible to adjust sizes of the metal particles and to prepare catalyst powder with an even particle diameter. In the reversed micelle method, a "reversed micellar solution" as shown in FIG. 3 is used. The reversed micellar solution is a solution composed of an organic solvent 51, an aqueous solution 53 containing noble metal ions, and amphiphiles 56 such as a surfactant. In the reversed micellar solution 50, the aqueous solution 53 and the amphiphiles 56 aggregate in the organic solvent 51, thus forming a reversed micelle 52. The aqueous solution 53 exists in an inside of the reversed micelle 52. In the organic solvent phase, each amphiphile 56 orients a hydrophobic group 54 to the outside, that is, to the organic solvent phase side, and orients a hydrophilic group 55 to the inside, that is, to the aqueous phase side. The orientations of the hydrophobic group 54 and the hydrophilic group 55 are reverse to those in the case of an aqueous solvent, and accordingly, this solution 50 is referred to as the reversed micellar solution. The reversed micellar solution as described above can be prepared by adding an aqueous solution to a solution having the amphiphiles dissolved in the organic solvent and by agitating an obtained mixture. A portion where the hydrophilic groups aggregate has a capability of holding polar molecules of water and the like. The aqueous solution concerned turns to extremely small droplets with a diameter of several nanometers to several ten nanometers, and is stably dispersed in the organic solvent. The size of the water droplets can be controlled by a molar ratio of injected water and the surfactant.

Figure 4:
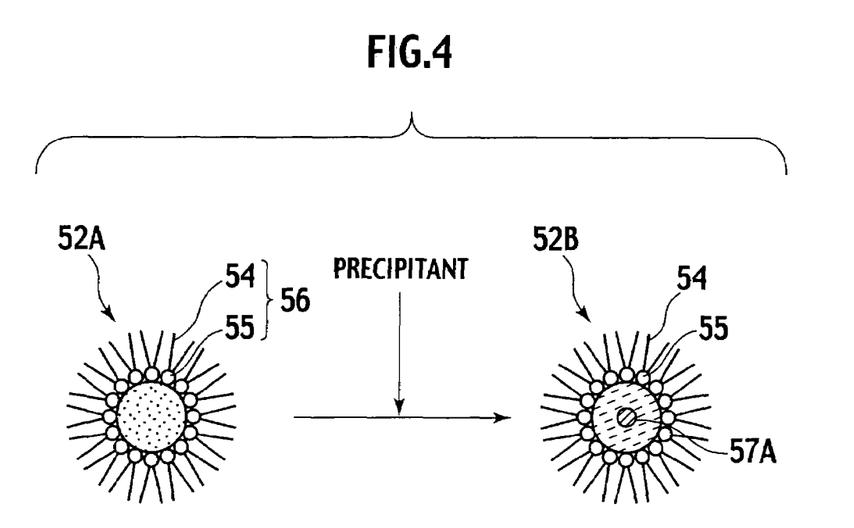
FIG. 4 is a view for explaining precipitation of a metal particle in an inside of the reversed micellar solution.

When a precipitant which precipitates the noble metal ions is added to the reversed micellar solution 50 containing the noble metal ion aqueous solution 53 in each reversed micelle 52, the noble metal ions are reduced to the noble metal in the inside of the reversed micelle 52, and turn to a colloidal noble metal particle 57. The precipitant may be added as an aqueous solution, or may be added as a reversed micellar solution containing the precipitant concerned in insides of micelles. Specific description will be made by use of FIG. 4. FIG. 4 shows the case where the precipitant is added as the aqueous solution. First, the surfactant 56 is mixed into the organic solvent, and the noble metal ion aqueous solution is added to a resultant. Then, a reversed micelle 52A is formed, in which the hydrophilic groups 55 are placed inside, and the hydrophobic groups 54 are placed outside. The noble metal ion aqueous solution is contained in the inside of the reversed micelle 52A. When the precipitant is mixed into this reversed micellar solution, the precipitant goes into the inside of the reversed micelle 52A, and a reduction reaction progresses in the reversed micelle 52A. Furthermore, when a particle 57A precipitated by reducing the noble metal ions is aged, a reversed micelle 52B containing the colloidal noble metal controlled by a micelle size can be obtained. Note that two or more of the noble metal ions or precursors of the transition metal and the carrier may be contained in the noble metal ion aqueous solution in the micelle. The inside of the micelle is excellent in dispersivity, and even if the two or more of noble metal ions are contained therein, a noble metal particle having an extremely even composition can be obtained.

As opposed to this, the impregnation method which has heretofore been used for producing the catalyst powder is a method for carrying the noble metal, in which a solution containing the noble metal and the like is impregnated into pores of the carrier to fix the noble metal to a pore wall, followed by drying and baking thereof. In the case of producing the catalyst powder by this impregnation method, the particle diameter of the noble metal becomes as extremely small as 1 nm or less, and heat resistance thereof is lowered. Meanwhile, the production of the catalyst powder by use of the reversed micelle method enables the particle diameter of the noble metal to be controlled to a size of 1 nm to 10 nm, and preferably, 3 nm to 8 nm. Moreover, it is made possible to control the size of the catalyst powder as a whole.

The method of producing catalyst powder of the present invention is characterized by including the step of precipitating the noble metal particles and the carrier in the reversed micelle substantially simultaneously, and the step of precipitating the transition metal particles in the reversed micelle. The noble metal and the carrier are precipitated in the reversed micelle substantially simultaneously, thus making it possible to obtain catalyst powder in which the noble metal is evenly dispersed in the carrier. Moreover, the noble metal and the carrier are precipitated substantially simultaneously, and thus the noble metal particles are precipitated in a state of being partially included by the carrier. Therefore, in the case of baking a precipitate obtained after the reversed micelle decays, a state where the noble metal particles are partially buried in the carrier, that is, the state as shown in FIG. 1 can be obtained. Thus, the carrier controls the movement of the noble metal particles on the surface of the carrier, and accordingly, the aggregation of the noble metal can be restricted. Moreover, the produced state of the catalyst powder can be maintained even after the catalyst powder is heated. Therefore, it is made possible to obtain the catalyst powder excellent in durability.

Furthermore, the transition metal is precipitated in the reversed micelle containing the noble metal and the carrier. Thus, it is made possible to place the transition metal particle on an outer surface of each complex particle of the noble metal particle and the carrier in the case of forming such a precipitate by decaying the reversed micelle. Therefore, it becomes possible to bring the transition metal particles into contact with both of the noble metal particles and the carrier.

Then, when the transition metal is in contact with both of the noble metal and the carrier, an effect of restricting the phase transition of the carrier is brought in addition to that the transition metal functions as the anchor of the noble metal particles to restrict the aggregation of the noble metal.

Note that, in the production method of the invention of this application, with regard to the step of precipitating the noble metal and the carrier in the reversed micelle substantially simultaneously and the step of precipitating the transition metal in the reversed micelle, similar catalyst powder can be obtained no matter which step may be performed first. However, it is preferable to perform the step of precipitating the noble metal and the carrier substantially simultaneously prior to the step of precipitating the transition metal. In this case, it is made possible to reduce the particle diameter of the noble metal, and it becomes easy for the transition metal to contact both of the noble metal and the carrier.

Figure 5:
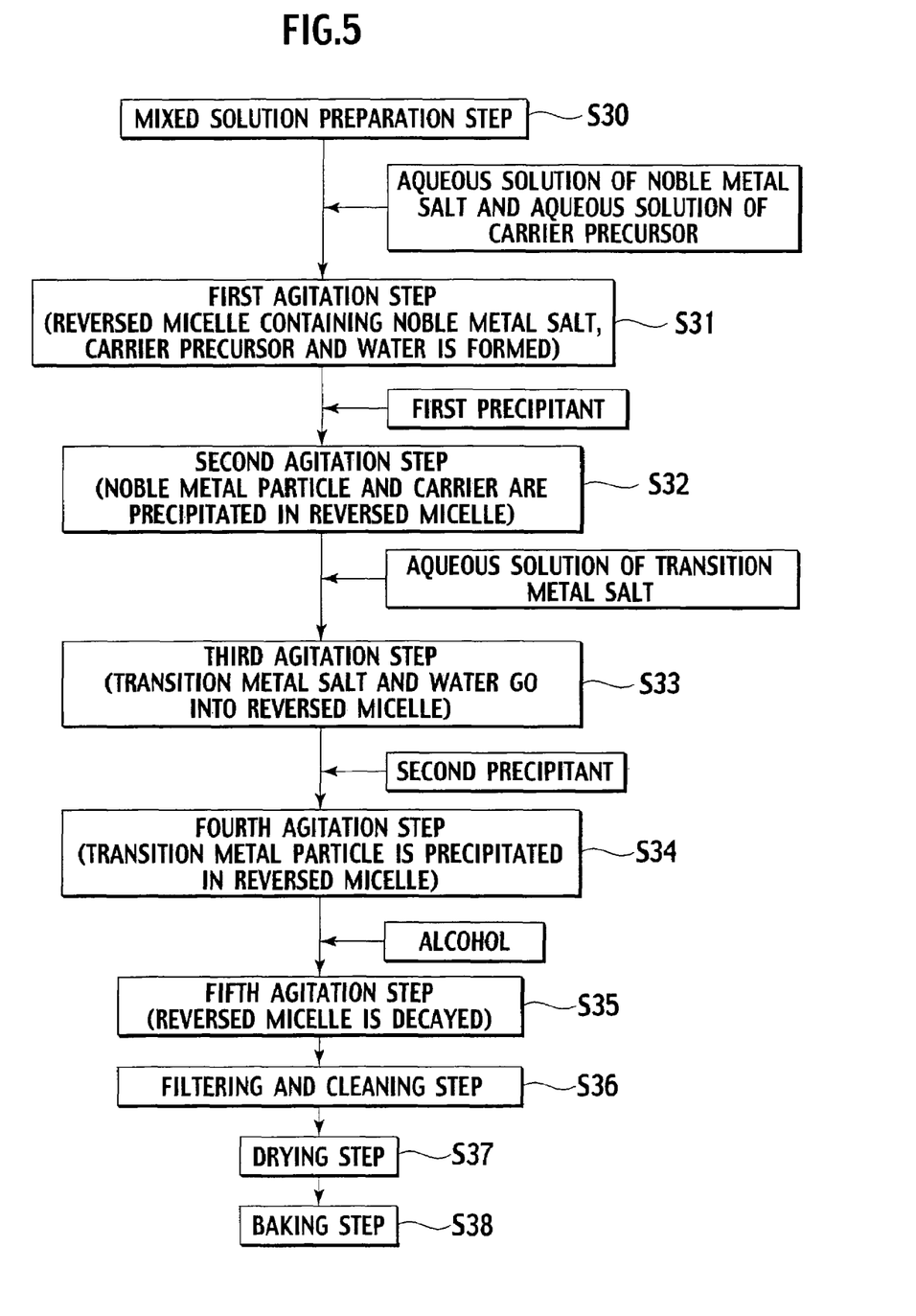
FIG. 5 is a process chart explaining a method of producing catalyst powder according to the present invention.

FIG. 5 is a chart explaining steps of the method of producing catalyst powder. First, a solution in which the surfactant is dissolved into the organic solvent is prepared (Step S30). Here, as the organic solvent, cyclohexane, cycloheptane, octanol, isooctane, n-hexane, n-decane, benzene, toluene, xylene, and the like are usable. Moreover, a mixed solution of two or more of these solvents may be used. As the surfactant, polyethylene glycol-p-nonylphenyl ether, pentaethylene glycol dodecyl ether, and the like are usable.

Into this solution, an aqueous solution containing noble metal salt and an aqueous solution containing a carrier precursor are put, and an obtained mixture is agitated (Step S31). In such a way, the surfactant is arrayed on the periphery of a spherical droplet with a size of a little more than ten nanometers. Moreover, in an aqueous phase in an inside of the spherical droplet, a reversed micelle containing the aqueous solution which contains the noble metal salt and the carrier precursor is formed. Here, nitrate, chloride, acetate, an amine compound and the like of the noble metal are usable as the noble metal salt. Moreover, acetate, nitrate, metal alkoxide and the like are usable as the carrier precursor. Furthermore, for each of the noble metal salt and the carrier precursor, a mixed solution of two or more of these materials may be used.

Next, a first precipitant is put into the mixed solution containing the reversed micelle, and an obtained mixture is agitated (Step S32). Thus, the noble metal particle and the carrier are precipitated in the inside of the reversed micelle substantially simultaneously. Here, the noble metal salt is metalized by the reduction and precipitated as the noble metal particle, and the carrier precursor is precipitated as hydroxide. Moreover, in the inside of the reversed micelle, the noble metal particle is precipitated in a state of being partially included by the carrier. Note that ammonia, tetramethylammonium, hydroxide of alkaline metal (sodium hydroxide), hydrazine, sodium borohydride and the like are usable as the first precipitant.

Thereafter, an aqueous solution containing transition metal salt is put into the mixed solution containing the reversed micelle, and an obtained mixture is agitated (Step S33). Thus, the transition metal salt and water are contained in the reversed micelle containing the noble metal particle and the carrier. Nitrate, chloride, acetate, an amine compound and the like of the transition metal are usable as the transition metal salt.

Next, a second precipitant is put into the mixed solution containing the reversed micelle, and an obtained mixture is agitated (Step S34). Thus, the transition metal salt in the inside of the reversed micelle is metalized and precipitated singly as a transition metal particle. Here, hydrazine, sodium borohydride, ammonia and the like are usable as the second precipitant. Moreover, two or more of these may be used.

Then, alcohol is put into this mixed solution containing the reversed micelle, and an obtained mixture is agitated (Step S35). Alcohol is put, and thus the droplet cannot maintain a shape thereof in the organic solvent. Accordingly, the reversed micelle decays. By such decay of the reversed micelle, a precipitate containing a particle in which the noble metal and the carrier are combined with each other and containing a particle of the transition metal is obtained. Note that methanol, ethanol and the like are usable as the alcohol.

Next, the obtained precipitate is filtered by a membrane filter, and is then cleaned by use of alcohol and water. Thus, impurities (surfactant and the like) contained in such a precipitate are removed (Step S36). Moreover, the processed precipitate is dried day and night (Step S37). After being dried, the precipitate is baked in airflow (Step S38). By such steps, the catalyst powder of the present invention can be obtained.

Moreover, the step of precipitating the transition metal in the reversed micelle may be performed prior to the step of precipitating the noble metal and the carrier in the reversed micelle substantially simultaneously. In this case, the combination of the transition metal and the carrier can be accelerated by precipitating the transition metal first.

Figure 6:
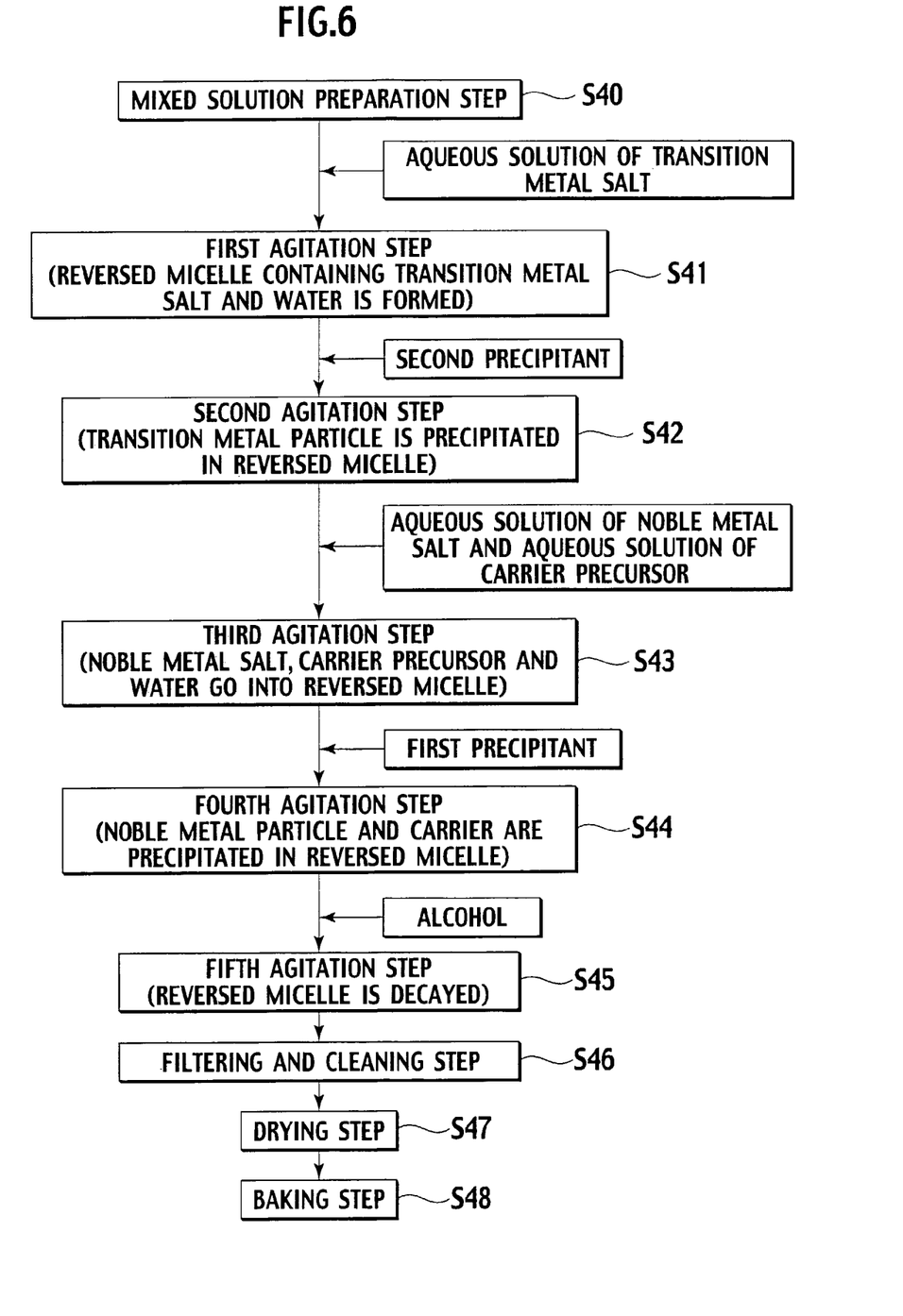
FIG. 6 is a process chart explaining another method of producing catalyst powder according to the present invention.

FIG. 6 is a chart explaining the method of producing catalyst powder by performing the step of precipitating the transition metal prior to the step of precipitating the noble metal and the carrier substantially simultaneously. First, in a similar way to the method described above with reference to FIG. 5, the solution in which the surfactant is dissolved into the organic solvent is prepared (Step S40). Into this solution, the aqueous solution containing the transition metal salt is put, and an obtained mixture is agitated (Step S41). In such a way, the surfactant is arrayed on the periphery of a spherical droplet with a size of a little more than ten nanometers. Moreover, in an aqueous phase in an inside of the spherical droplet, a reversed micelle containing the aqueous solution which contains the transition metal salt is formed. Next, the second precipitant is put into the mixed solution containing the reversed micelle, and an obtained mixture is agitated (Step S42). Thus, the transition metal particle is singly precipitated in the inside of the reversed micelle. Here, the transition metal salt is metalized by the reduction and precipitated as the transition metal particle.

Thereafter, the aqueous solution of the noble metal salt and the aqueous solution of the carrier precursor are mixed into the mixed solution containing the reversed micelle, and an obtained mixture is agitated (Step S43). Thus, the noble metal salt, the carrier precursor and water are contained in the reversed micelle containing the transition metal particle. Next, the first precipitant is put into the mixed solution containing the reversed micelle, and an obtained mixture is agitated (Step S44). Thus, the noble metal particle and the carrier are precipitated in the inside of the reversed micelle substantially simultaneously. Here, the noble metal salt is metalized by the reduction and precipitated as the noble metal particle, and the carrier precursor is precipitated as hydroxide. Note that the noble metal particle is precipitated in the inside of the reversed micelle in a state of being partially included by the carrier.

Then, alcohol is put into this mixed solution containing the reversed micelle, and an obtained mixture is agitated (Step S45). Alcohol is put, and thus the droplet cannot maintain a shape thereof in the organic solvent. Accordingly, the reversed micelle decays. By such decay of the reversed micelle, a precipitate containing the particle in which the noble metal and the carrier are combined with each other and containing the particle of the transition metal is obtained.

Then, the obtained precipitate is filtered by the membrane filtered, and is then cleaned by use of alcohol and water. Thus, the impurities (surfactant and the like) contained in the precipitate are removed (Step S46). Moreover, the processed precipitate is dried day and night (Step S47). After being dried, the precipitate is baked in airflow (Step S48). By such steps, the catalyst powder of the present invention can be obtained.

Note that, in the production methods shown in FIGS. 5 and 6, the catalytic activity of the transition metal differs depending on an element thereof and conditions where the catalyst is used. Moreover, a ratio of the transition metal in the complex compound with the carrier also differs depending on the element. Hence, in order to obtain a desired catalytic activity, type of the first precipitant and the second precipitant, reaction temperatures, reaction times, agitation strengths, agitation methods and the like may be changed as appropriate.

Moreover, as described above, at least one selected from Ce, Nd, Pr, La, Zr, Ba and Mg may be added to the catalyst powder of the present invention. For a method for adding such an element, a method of containing the above-described element in the inside of the reversed micelle and precipitating the element in a similar way to the noble metal and the transition metal may also be used besides an addition method of impregnating the catalyst powder into an aqueous solution containing the above-described element after preparing the catalyst powder.

As described above, the method of producing catalyst powder in the present invention includes the step of precipitating the noble metal particle and the carrier in the reversed micelle substantially simultaneously, and the step of precipitating the transition metal particle in the reversed micelle. Thus, it is made possible to obtain the catalyst powder including the noble metal particle which is partially buried in the porous carrier, is carried in the state of being held by the carrier, and has the mean particle diameter of 1 to 10 nm, and the transition metal in contact with both of the noble metal particle and the porous carrier.

(Exhaust Gas Purifying Catalyst)

Next, an embodiment of the exhaust gas purifying catalyst according to the present invention will be described. The exhaust gas purifying catalyst according to this embodiment is characterized by including a catalyst layer including the above-described catalyst powder. Note that, preferably, the amount of noble metal is 0.7 g or less per a volume of 1 L of the exhaust gas purifying catalyst. In the conventional exhaust gas purifying catalyst, when the amount of noble metal is 0.7 g or less per 1 L thereof, a sufficient catalytic activity cannot be obtained. However, in the catalyst powder of the present invention, when the noble metal particles are buried in the carrier, and the transition metal particles are in contact with both of the noble metal particles and the carrier, the sufficient catalytic activity can be obtained even if the amount of noble metal usage is decreased thanks to the anchor effect and the effect that the transition metal supplements the catalytic activity of the noble metal.

The exhaust gas purifying catalyst according to the present invention will be more specifically described below by Examples 1 to 3 and Comparative examples 1 and 2. However, the scope of the present invention is not limited to these examples. These examples are ones in which effectiveness of the exhaust gas purifying catalyst according to the present invention was investigated, and ones showing examples of the exhaust gas purifying catalyst, which were adjusted by different materials.

(Preparation of Samples)

EXAMPLE 1

In Example 1, according to the process shown in FIG. 5, the noble metal and the carrier were first precipitated, and then, the transition metal was singly precipitated.

1. Preparation of Powder of Pt (0.3% by Weight)-Co (5% by Weight)-$Al_2O_3$

5 L of cyclohexane was used as the organic solvent, 330 g of polyethylene glycol-p-nonylphenyl ether was used as the surfactant, and both were mixed together to prepare a mixed solution (Step S30). Here, a ratio of the surfactant and the organic solvent (surfactant/organic solvent [mol/L]) is 0.15.

Next, into the prepared mixed solution, 0.178 g of a dinitrodiamine platinum solution with a platinum concentration of 8.46%, which was as a material of the noble metal, 36.79 g of aluminum nitrate as a material of the carrier, and 37.92 mL of water were added. An obtained mixture was agitated for two hours, and thus a mixed solution containing the reversed micelle which contained the noble metal salt and the carrier precursor therein was prepared (Step S31). Here, a ratio of the water and the surfactant (water/surfactant) is 4.

Next, 11.1 g of $NaBH_4$ was put as the first precipitant into the mixed solution described above. An obtained mixture was agitated for another two hours, and thus a solution containing Pt particle and aluminum hydroxide in the reversed micelle was obtained (Step S32). Here, a weight ratio of $NaBH_4$ to Pt and aluminum nitrate ($NaBH_4$/(Pt+aluminum nitrate)) is 3.

Next, a solution prepared by dissolving 1.3 g of cobalt nitrate as a material of the transition metal into 2 mL of water was put, and an obtained mixture was agitated for two hours. Thus, a mixed solution containing Co ions in the reversed micelle was prepared (Step S33).

Next, 30.4 g of hydrazine was put as the second precipitant, and an obtained mixture was agitated for another two hours. Thus, the Co ions in the reversed micelle ware reduced to be metalized (Step S34).

Then, 500 mL of methanol was put into the mixed solution described above, and an obtained mixture was agitated for two hours. Thus, the reversed micelle was decayed (Step S35). Subsequently, the solution was filtered by the membrane filter. Thereafter, a precipitate obtained by the filtering was cleaned by use of ethanol and water (Step S36), and the cleaned precipitate was dried day and night at 120° C. (Step S37). Then, the dried precipitate was baked at 400° C. for an hour, and thus powder was obtained (Step S38). A series of these steps was repeated 20 times. Thus, 73 g of catalyst powder which individually carried 0.3% by weight of Pt and 5% by weight of Co with respect to $Al_2O_3$ was obtained. Here, yield was 73%.

Next, cerium acetate, lanthanum acetate and zirconium acetate were impregnated into the powder obtained by the above-described preparation so as to be 8.5% by weight, 5.5% by weight and 6% by weight in oxide conversion, respectively. Then, an obtained mixture was dried at 120° C. day and night, and baked at 400° C. for an hour, thus powder A was obtained.

Meanwhile, zirconium acetate was impregnated into 100 g of alumina with a specific surface area of 200 $m^2$/g so as to be 5% by weight with respect thereto. An obtained mixture was dried at 120° C. day and night, and baked at 900° C. for 4 hours. Thus, powder was obtained. Thereafter, rhodium nitrate was impregnated into the obtained powder so as to be 0.3% by weight with respect thereto. An obtained mixture was dried at 120° C. day and night, and baked at 900° C. for 4 hours. Powder thus obtained was referred to as powder B.

2. Coating on Honeycomb Substrate 52.5 g of the powder A, 18.8 g of the powder B, 3.7 g of alumina sol, 69 g of water and 6 g of nitric acid were put into a magnetic ball mill, and mixed and milled there, and thus slurry was obtained. Next, the obtained slurry was adhered onto a cordierite honeycomb substrate (0.119 L, 400 cells), and excessive slurry on the cells was removed by airflow, followed by drying at 120° C. and baking at 400° C. for an hour. In such a way, an exhaust gas purifying catalyst with a coating amount of 150.0 g/L was obtained. In this case, the individual amounts of metals contained per 1 L of the substrate were: Pt: 0.315 g/L; and Rh: 0.113 g/L, which were totalized to 0.428 g/L.

EXAMPLE 2

In Example 2, according to the process shown in FIG. 6, the transition metal was first precipitated singly, and then the noble metal and the carrier were precipitated simultaneously.

1. Preparation of Powder of Pt (0.3% by Weight)-Co (5% by Weight)-$Al_2O_3$

5 L of cyclohexane was used as the organic solvent, 330 g of polyethylene glycol-p-nonylphenyl ether was used as the surfactant, and both were mixed together to prepare a mixed solution (Step S40). Here, a ratio of the surfactant and the organic solvent (surfactant/organic solvent [mol/L]) is 0.15.

Next, into the prepared mixed solution, a solution in which 1.3 g of cobalt nitrate was dissolved as a material of the transition metal into 2 mL of water was put. An obtained mixture was agitated for two hours, and thus a mixed solution containing Co ions in the reversed micelle was prepared (Step S41). Thereafter, 30.4 g of hydrazine was put as the second precipitant, and an obtained mixture was agitated for another two hours. Thus, the Co ions in the reversed micelle were reduced to be metalized (Step S42).

Next, into the mixed solution thus obtained, 0.178 g of a dinitrodiamine platinum solution with a platinum concentration of 8.46%, which was as a material of the noble metal, 36.79 g of aluminum nitrate as a material of the carrier, and 37.92 mL of water were added (ratio of water/surfactant=4). An obtained mixture was agitated for two hours, and thus a mixed solution containing the reversed micelle which contained the noble metal salt and the carrier precursor therein was prepared (Step S43). Here, a ratio of the water and the surfactant (water/surfactant) is 4.

Next, 11.1 g of $NaBH_4$ was put as the first precipitant into the mixed solution described above. An obtained mixture was agitated for another two hours, and thus a solution containing Pt metal and aluminum nitrate in the reversed micelle was obtained (Step S44). Here, a weight ratio of $NaBH_4$ to Pt and aluminum nitrate ($NaBH_4$/(Pt+aluminum nitrate)) is 3.

Then, 500 mL of methanol was put into the mixed solution described above, and an obtained mixture was agitated for two hours. Thus, the reversed micelle was decayed (Step S45). Subsequently, the solution was filtered by the membrane filter. Thereafter, a precipitate obtained by the filtering was cleaned by use of ethanol and water (Step S46), and the cleaned precipitate was dried day and night at 120° C. (Step S47). Then, the dried precipitate was baked at 400° C. for an hour, and thus powder was obtained (Step S48). A series of these steps was repeated 20 times. Thus, 69 g of catalyst powder which individually carried 0.3% by weight of Pt and 5% by weight of Co with respect to $Al_2O_3$ was obtained (yield was 69%).

Steps that follow were processed in a similar way to Embodiment 1, and a target catalyst was obtained.

EXAMPLE 3

In Example 3, the noble metal and the carrier were first precipitated, and then the transition metal was precipitated singly. Note that a different point from Example 1 is that the amount of platinum to be carried is doubled.

1. Preparation of Powder of Pt (0.6% by Weight)-Co (5% by Weight)-$Al_2O_3$

5 L of cyclohexane as the organic solvent and 330 g of polyethylene glycol-p-nonylphenyl ether as the surfactant were mixed together to prepare a mixed solution (Step S30). Here, a ratio of the surfactant and the organic solvent (surfactant/organic solvent [mol/L]) is 0.15.

Next, into the prepared mixed solution, 0.357 g of a dinitrodiamine platinum solution with a platinum concentration of 8.46%, which was as a material of the noble metal, 36.79 g of aluminum nitrate as a material of the carrier, and 37.74 mL of water were added (ratio of water/surfactant=4). An obtained mixture was agitated for two hours, and thus a mixed solution containing the reversed micelle which contained the noble metal salt and the carrier precursor therein was prepared (Step S31). Here, a ratio of the water and the surfactant (water/surfactant) is 4.

Next, 11.1 g of $NaBH_4$ was put as the first precipitant into the mixed solution described above. An obtained mixture was agitated for another two hours, and thus a solution containing Pt metal and aluminum nitrate in the reversed micelle was obtained (Step S32). Here, a weight ratio of $NaBH_4$ to Pt and aluminum nitrate ($NaBH_4$/(Pt+aluminum nitrate)) is 3.

Next, a solution prepared by dissolving 1.3 g of cobalt nitrate as a material of the transition metal into 2 mL of water was put, and an obtained mixture was agitated for two hours. Thus, a mixed solution containing Co ions in the reversed micelle was prepared (Step S33).

Next, 30.4 g of hydrazine was put as the second precipitant, and an obtained mixture was agitated for another two hours. Thus, the Co ions in the reversed micelle ware reduced to be metalized (Step S34).

Then, 500 mL of methanol was put into the mixed solution described above, and an obtained mixture was agitated for two hours. Thus, the reversed micelle was decayed (Step S35). Subsequently, the solution was filtered by the membrane filter. Thereafter, a precipitate obtained by the filtering was cleaned by use of ethanol and water (Step S36), and the cleaned precipitate was dried day and night at 120° C. (Step S37). Then, the dried precipitate was baked at 400° C. for an hour, and thus powder was obtained (Step S38). A series of these steps was repeated 20 times. Thus, 76 g of catalyst powder which individually carried 0.6% by weight of Pt and 5% by weight of Co with respect to $Al_2O_3$ was obtained (yield was 76%).

Steps that follow were processed in a similar way to Embodiment 1, and a target catalyst was obtained. The obtained catalyst powder was coated on a honeycomb substrate in a similar way to Example 1, and thus a catalyst with a coating amount of 150.0 g/L was obtained. In this case, the individual amounts of metals contained per 1 L of the substrate were: Pt: 0.63 g/L; and Rh: 0.113 g/L, which were totalized to 0.743 g/L.

COMPARATIVE EXAMPLE 1

In Comparative example 1, catalyst powder was produced by use of an impregnation method.

1. Preparation of Powder of Pt (0.3% by Weight)-Co (5% by Weight)-$Al_2O_3$

First, into 100 g of alumina with a specific surface area of 200 $m^2$/g, dinitrodiamine platinum was impregnated so as to be 0.6% by weight, followed by drying at 120° C. day and night and baking at 400° C. for an hour. Thus, powder was obtained. Into the obtained powder, cerium acetate, lanthanum acetate and zirconium acetate were impregnated so as to be 8.5% by weight, 5.5% by weight and 6% by weight in oxide conversion, respectively. Thereafter, an obtained mixture was dried at 120° C. day and night, and baked at 400° C. for an hour. Powder thus obtained was referred to as powder A.

Moreover, into 100 g of alumina with a specific surface area of 200 $m^2$/g and a mean pore diameter of 20 nm, cobalt nitrate was impregnated so as to be 3% by weight, followed by drying at 120° C. day and night and baking at 400° C. for an hour. Thus, powder was obtained. Into the obtained powder, cerium acetate, lanthanum acetate and zirconium acetate were impregnated so as to be 8.5% by weight, 5.5% by weight and 6% by weight in oxide conversion, respectively. Thereafter, an obtained mixture was dried at 120° C. day and night, and baked at 400° C. for an hour. Powder thus obtained was referred to as powder B.

Furthermore, into 100 g of alumina with a specific surface of 200 $m^2$/g, zirconium acetate was impregnated so as to be 5% by weight in oxide conversion with respect to the alumina, followed by drying at 120° C. day and night and baking at 900° C. for an hour. Thus, powder was obtained. Into the obtained powder, rhodium acetate was impregnated so as to be 0.3% by weight with respect to the alumina. Thereafter, an obtained mixture was dried at 120° C. day and night, and baked at 400° C. for an hour. Powder thus obtained was referred to as powder C.

2. Coating on Honeycomb Substrate 26.3 g of the powder A, 26.2 g of the powder B, 18.8 g of the powder C, 3.7 g of alumina sol, 69 g of water and 6 g of nitric acid were put into a magnetic ball mill, and mixed and milled there, and thus slurry was obtained. The obtained slurry was adhered onto a cordierite honeycomb substrate (0.119 L, 400 cells), and excessive slurry on the cells was removed by airflow, followed by drying at 120° C., and baking at 400° C. for an hour. In such a way, a catalyst with a coating amount of 150.0 g/L was obtained. In this case, the individual amounts of metals contained per 1 L of the substrate were: Pt: 0.315 g/L; and Rh: 0.113 g/L, which were totalized to 0.428 g/L.

COMPARATIVE EXAMPLE 2

In Comparative example 2, catalyst powder was produced by use of the impregnation method. Note that a different point from Comparative example 1 is that the amount of platinum to be carried is doubled.

1. Preparation of Powder of Pt (0.6% by Weight)-Co (5% by Weight)-$Al_2O_3$

First, into 100 g of alumina with a specific surface area of 200 $m^2$/g, dinitrodiamine platinum was impregnated so as to be 1.2% by weight, followed by drying at 120° C. day and night and baking at 400° C. for an hour. Thus, powder was obtained. Into the obtained powder, cerium acetate, lanthanum acetate and zirconium acetate were impregnated so as to be 8.5% by weight, 5.5% by weight and 6% by weight in oxide conversion, respectively. Thereafter, an obtained mixture was dried at 120° C. day and night, and baked at 400° C. for an hour. Powder thus obtained was referred to as powder A.

Moreover, into 100 g of alumina with a specific surface area of 200 m²/g and a mean pore diameter of 20 nm, cobalt nitrate was impregnated so as to be 3% by weight, followed by drying at 120° C. day and night and baking at 400° C. for an hour. Thus, powder was obtained. Into the obtained powder, cerium acetate, lanthanum acetate and zirconium acetate were impregnated so as to be 8.5% by weight, 5.5% by weight and 6% by weight in oxide conversion, respectively. Thereafter, an obtained mixture was dried at 120° C. day and night, and baked at 400° C. for an hour. Powder thus obtained was referred to as powder B.

Furthermore, into alumina with a specific surface of 200 m²/g, zirconium acetate was impregnated so as to be 5% in oxide conversion with respect to the alumina, followed by drying at 120° C. day and night and baking at 900° C. for an hour. Thus, powder was obtained. Into the obtained powder, rhodium acetate was impregnated so as to be 0.3% by weight. Thereafter, an obtained mixture was dried at 120° C. day and night, and baked at 400° C. for an hour. Powder thus obtained was referred to as powder C.

2. Coating on Honeycomb Substrate 26.3 g of the powder A, 26.2 g of the powder B, 18.8 g of the powder C, 3.7 g of alumina sol, 69 g of water and 6 g of nitric acid were put into a magnetic ball mill, and mixed and milled there, and thus slurry was obtained. The obtained slurry was adhered onto a cordierite honeycomb substrate (0.119 L, 400 cells), and excessive slurry on the cells was removed by airflow, followed by drying at 120° C., and baking at 400° C. for an hour. In such a way, a catalyst with a coating amount of 150.0 g/L was obtained. In this case, the individual amounts of metals contained per 1 L of the substrate were: Pt: 0.63 g/L; and Rh: 0.113 g/L, which were totalized to 0.743 g/L.

(Durability Test)

A durability test of the exhaust gas purifying catalyst was performed by baking the obtained catalyst powders at 700° C. for an hour in an oxygen atmosphere.

(Method for Evaluating Conversion Rate)

50% conversion rate temperature of the catalyst powder when temperature was raised from room temperature to 400° C. at a rate of 10° C./min. while using reaction gas with a composition shown in Table 1 was obtained. Further, a conversion rate at 400° C. of the catalyst powder was obtained. Note that the 50% conversion rate temperature is a temperature in which a conversion rate of a reaction gas becomes 50%. Measurement conditions for the 50% conversion rate temperature were as follows: an A/F ratio was made stoichiometric; and a flow rate of the reaction gas was set at 40 L/min.

TABLE 1

| Z value | 1.000 |
|---|---|
| A/F | 14.5 |
| NO | 1000 ppm |
| CO | 0.6% |
| H₂ | 0.2% |
| O₂ | 0.6% |
| CO₂ | 13.9% |
| HC | 1665 ppmC |
| H₂O | 10% |
| N₂ | Rest |

(Method for Measuring Degree of Dispersion of Noble Metal)

For measuring the degree of dispersion of the noble metal, a rare metal dispersion measurement BEL-METAL-3 made by Bel Japan, Inc. was used, and the measurement was performed according to the following procedure. Each sample was heated up to 400° C. at the rate of 10° C./min. in a gas flow of 100% He, and next, was subjected to an oxidation treatment at 400° C. for 15 minutes in a gas flow of 100% $O_2$. Then, the filled gas was purged by a gas of 100% He for 5 minutes, and the sample was subjected to a reduction treatment at 400° C. for 15 minutes in a flow of a balance gas of 40% $H_2$/He. Next, the sample was cooled down to 50° C. in a gas flow of 100% He. Then, in a way of outputting pulses, a balance gas of 10% CO/He was flown in. From an amount of CO adsorption, the degree of dispersion of the noble metal was obtained in accordance with Expression 1 shown below.

$$\text{Degree of dispersion (\%)} = \frac{100 \times \text{Atomic weight of carried metal} \times \text{Adsorption amount per unit}}{22414 \times \text{Stoichiometric ratio} \times \text{Content of carried metal}} \quad \text{(Expression 1)}$$

Note that the adsorption amount per unit was obtained by the following Expression 2.

$$\text{Adsorption amount} (\text{cm}^3/\text{g}) = \frac{\text{Total adsorption amount}}{\text{Sample weight}} \quad \text{(Expression 2)}$$

(Measurement of Particle Diameter of Noble Metal)

A catalyst layer of each exhaust gas purifying catalyst obtained by preparing each sample described above was evaluated by means of a TEM-EDX measurement. Measurements were performed by use of HF-2000 made by Hitachi, Ltd. with an acceleration voltage of 200 kV. With regard to a measurement method, the catalyst was packed by epoxy resin, and after the epoxy resin was cured, an extremely thin slice was prepared by ultramicrotome. Dispersion states of various crystalline particles in this slice were observed by means of a transmission electron microscope (TEM). Contrast portions were focused in an obtained image, a type of the metal was defined, and a particle diameter of the metal was measured.

(Surface Analyses)

Analyses of qualifications, quantities and conditions of the elements of the sample were performed by use of X-ray photoelectron spectroscopy (XPS). Measurements were performed by fixing the sample on indium foil under the following conditions. For a device for the analyses, ESCA5600 made by ULVAC-PHI, Incorporated was used. For an X-ray source, an Al-Kα ray (1486.6 eV, 300V) was used. An extraction angle of photoelectrons was set at 45° (measurement depth was 4 nm). Moreover, a measurement area was set at 2 mm×0.8 mm. In addition, in the measurements, hydrogen (0.2% hydrogen/nitrogen) as one of the compositions of the exhaust gas was brought into contact with the sample at 400° C. for 10 minutes in a pretreatment chamber attached to the XPS device. Thereafter, the XPS measurements were implemented.

Table 2 shows 50% conversion rate temperatures (° C.) after the durability test, conversion rates (%) at 400° C. after the durability test, amounts (g/L) of the noble metal usages (Pt+Rh), particles diameters (nm) of Pt, and degrees of dispersion (X1) when the catalyst powders were produced (after being baked at 400° C.) in the above-described Examples 1 to 3 and Comparative examples 1 and 2.

ingly, it is conceived that the 50% conversion rate temperature rises. Moreover, the values of Example 3 and Comparative example 2 are compared with each other. When the amounts of noble metal usages were 0.743 g/L, even if the catalyst was produced by the reversed micelle method, the 50% purification temperature after the durability test hardly differs from that in the case where the catalyst is produced by the impreg-

TABLE 2

| | Production method | 50% conversion rate temperature after durability (° C.) | | | Conversion rate at 400° C. after durability (%) | | | Amount of noble metal (g/L) | Particle diameter of Pt (nm) | Degree of dispersion when producing catalyst |
|---|---|---|---|---|---|---|---|---|---|---|
| | | HC | CO | NOx | HC | CO | NOx | | | |
| Ex. 1 | Reversed micelle method | 274 | 243 | 257 | 99 | 99 | 99 | 0.428 | 4.7 | 58 |
| Ex. 2 | Reversed micelle method | 276 | 248 | 258 | 99 | 99 | 99 | 0.428 | 4.9 | 56 |
| Ex. 3 | Reversed micelle method | 261 | 238 | 248 | 99 | 99 | 99 | 0.743 | 5.2 | 53 |
| Com. Ex. 1 | Impregnation method | 285 | 261 | 268 | 99 | 99 | 99 | 0.428 | 1 or less | 74 |
| Com. Ex. 2 | Impregnation method | 262 | 237 | 248 | 99 | 99 | 99 | 0.743 | 1 or less | 72 |

From Table 2, the degree of dispersion of the powder obtained in Example 1 was 58%, the degree of dispersion of the powder obtained in Example 2 was 56%, and the degree of dispersion of the powder obtained in Example 3 was 53%. Moreover, the degree of dispersion of the powder obtained in Comparative example 1 was 74%, and the degree of dispersion of the powder obtained in Comparative example 2 was 72%.

Moreover, from the results obtained by the TEM-EDX measurements, the particle diameter of Pt of the powder obtained in Example 1 was 4.7 nm, the particle diameter of Pt of the powder obtained in Example 2 was 4.9 nm, and the particle diameter of Pt of the powder obtained in Example 3 was 5.2 nm. Moreover, the particle diameters of Pt obtained in Comparative examples 1 and 2 were 1 nm or less (a measurement limit value or less).

Between Examples 1 and 2, an order of the precipitation of the noble metal particle and the carrier and the precipitation of the transition metal particle is different. However, with regard to the 50% conversion rate temperature after the durability test, the conversion rate at 400° C. after the durability test, the particle diameter of Pt and the degree of dispersion when producing the catalyst, approximately equal values were obtained in both of Examples 1 and 2. From this, it is understood that it is possible to obtain similar effects no matter which precipitations may be performed first.

Moreover, as compared with the values of Comparative example 1, the degrees of dispersion when producing the catalyst were lower in the values obtained in Examples 1 and 2. However, though the amounts of noble metal usages were the same, the 50% conversion rate temperatures after the durability tests in the samples obtained in Examples 1 and 2 were significantly lower as compared with those in the sample obtained in Comparative example 1. In the sample obtained in Comparative example 1, the particle diameter of Pt is small, and the Pt aggregates after the durability test, and accordnation method. In this case, no great effect brought by producing the catalyst by the reversed micelle method is not seen. From these results, it is understood that catalyst excellent in durability can be obtained when the catalyst is produced by the reversed micelle method within a range where the amount of noble metal is 0.7 g/L or less.

The entire content of a Japanese Patent Application No. P2004-048370 with a filing date of Feb. 24, 2004 is herein incorporated by reference.

Although the invention has been described above by reference to certain embodiments of the invention, the invention is not limited to the embodiments described above will occur to these skilled in the art, in light of the teachings. The scope of the invention is defined with reference to the following claims.

INDUSTRIAL APPLICABILITY

In the catalyst powder of the invention of this application, the noble metal particles are buried in the porous carrier, and thus the anchor effect is obtained. Accordingly, the aggregation of the noble metal can be controlled, thus making it possible to obtain the catalyst powder excellent in durability. Hence, the catalytic activity performance when the catalyst powder is produced is maintained. Moreover, the effect that transition metal supplements the catalytic activity of the noble metal is obtained, and the amount of noble metal usage can be decreased.

The invention claimed is:

1. A catalyst powder, comprising:
   a porous carrier;
   a noble metal particle which is partially buried in the porous carrier and carried in a state of being held by the carrier, the noble metal particle having a mean particle diameter of 1 to 10 nm; and
   a transition metal particle in contact with both of the noble metal particle and the porous carrier.

2. The catalyst powder of claim 1, wherein a part or whole of the transition metal particle forms a complex compound together with the carrier.

3. The catalyst powder of claim 1, wherein a degree of dispersion of the noble metal carried on the carrier is 50% or more.

4. The catalyst powder of claim 1,
   wherein the noble metal is at least one selected from the group consisting of platinum, palladium and rhodium,
   wherein the transition metal is at least one selected from the group consisting of manganese, iron, cobalt, nickel, copper and zinc, and
   wherein the carrier is a porous substance of at least one selected from the group consisting of alumina, ceria, zirconia, silica, titania and silica-alumina.

5. The catalyst powder of claim 1, further comprising:
   a compound composed of at least one selected from the group consisting of cerium, neodymium, praseodymium, lanthanum, zirconium, barium and magnesium.

6. An exhaust gas purifying catalyst, comprising:
   catalyst powder including: a porous carrier; noble metal particles which are partially buried in the porous carrier and carried in a state of being held by the carrier, and have a mean particle diameter of 1 to 10 nm; and transition metal particles in contact with both of the noble metal particles and the porous carrier,
   wherein an amount of the noble metal is 0.7 g or less per 1 L of a volume of the exhaust gas purifying catalyst.

* * * * *